United States Patent
Shultz et al.

(10) Patent No.: US 10,708,688 B2
(45) Date of Patent: Jul. 7, 2020

(54) CONFERENCING MICROPHONE SYSTEM

(71) Applicant: Marshall Electronics, Inc., Torrance, CA (US)

(72) Inventors: Leonard Marshall Shultz, Torrance, CA (US); Alex Sukharev, Torrance, CA (US)

(73) Assignee: Marshall Electronics, Inc., Torrance, CA (US)

(*) Notice: Subject to any disclaimer, the term of this patent is extended or adjusted under 35 U.S.C. 154(b) by 0 days.

(21) Appl. No.: 16/431,268

(22) Filed: Jun. 4, 2019

(65) Prior Publication Data
US 2019/0373365 A1 Dec. 5, 2019

Related U.S. Application Data

(60) Provisional application No. 62/680,803, filed on Jun. 5, 2018.

(51) Int. Cl.
*H04R 3/00* (2006.01)
*H04M 3/56* (2006.01)

(52) U.S. Cl.
CPC ............ *H04R 3/005* (2013.01); *H04M 3/562* (2013.01); *H04M 3/568* (2013.01)

(58) Field of Classification Search
None
See application file for complete search history.

(56) References Cited

U.S. PATENT DOCUMENTS

| | | | | |
|---|---|---|---|---|
| 2005/0233778 | A1* | 10/2005 | Rodman | H04B 1/40 455/569.1 |
| 2007/0147634 | A1* | 6/2007 | Chu | H04R 3/005 381/92 |
| 2009/0268899 | A1* | 10/2009 | Tokuda | H04M 1/6033 379/420.02 |

OTHER PUBLICATIONS

Zuo, Baozhu. "ReSpeaker Mic Array v2.0." Seeedstudio, Seeedstudio, Mar. 23, 2018, wiki.seeedstudio.com/ReSpeaker_Mic_Array_v2.0/. (Year: 2018).*

* cited by examiner

*Primary Examiner* — Kenny H Truong
(74) *Attorney, Agent, or Firm* — Welsh Flaxman & Gitler LLC

(57) ABSTRACT

A conferencing microphone system includes a conference microphone having a central housing member and a plurality of appendage housing members. Each of the plurality of appendage housing members includes a microphone housed therein, and each of the microphones includes a USB output connected to a USB Hub contained within the central housing member. The USB Hub includes a first USB input/output and a second USB input/output coupled thereto in a manner allowing connection of a plurality of conference microphones together.

18 Claims, 7 Drawing Sheets

CONFERENCING MICROPHONE SYSTEM

CROSS REFERENCE TO RELATED APPLICATION

This application claims the benefit of U.S. Provisional Patent Application Ser. No. 62/680,803, entitled "CONFERENCING MICROPHONE SYSTEM," filed Jun. 5, 2018.

BACKGROUND OF THE INVENTION

1. Field of the Invention

The present invention relates to a conferencing microphone system.

2. Description of the Related Art

While conferencing microphones have become a ubiquitous part of corporate life, available conferencing microphone systems offer limited functionality and versatility. Available conferencing microphone systems provide a "one size fits all" solution that forces users to adapt to the system rather than adapting the system to users.

The present conferencing microphone systems provides a versatile conferencing microphone system offering great sound and a high degree of functionality designed to suit the specific needs of users.

SUMMARY OF THE INVENTION

It is, therefore, an object of the present invention to provide a conferencing microphone system including a conference microphone having a central housing member and a plurality of appendage housing members. Each of the plurality of appendage housing members includes a microphone housed therein, and each of the microphones includes a USB output connected to a USB Hub contained within the central housing member. The USB Hub includes a first USB input/output and a second USB input/output coupled thereto in a manner allowing connection of a plurality of conference microphones together.

It is also an object of the present invention to provide a conferencing microphone system wherein the USB Hub includes a microprocessor allowing for control of the microphones.

It is another object of the present invention to provide a conferencing microphone system wherein the USB Hub is connected to a computer for operation and control of the conference microphone.

It is a further object of the present invention to provide a conferencing microphone system wherein each of the microphones is composed of three cardioid condenser capsules.

It is also an object of the present invention to provide a conferencing microphone system wherein the three cardioid condenser capsules are arranged in a pyramid.

It is another object of the present invention to provide a conferencing microphone system wherein the central housing member is substantially square shaped when viewed from above and includes a top surface, a bottom surface, and four sides extending between the top surface and the bottom surface.

It is a further object of the present invention to provide a conferencing microphone system wherein a first appendage housing member extends from a first side of the central housing member, a second appendage housing member extends from a second side of the central housing member, a third appendage housing member extends from a third side of the central housing member, and a fourth appendage housing member extends from a fourth side of the central housing member.

It is also an object of the present invention to provide a conferencing microphone system wherein each of the first appendage housing member, the second appendage housing member, the third appendage housing member, and the fourth appendage housing member includes a top surface, a bottom surface, and sides extending between the top surface and the bottom surface.

It is another object of the present invention to provide a conferencing microphone system wherein each of the first appendage housing member, the second appendage housing member, the third appendage housing member, and the fourth appendage housing member extends from the central housing member toward a free end thereof, and the top surface of each of the first appendage housing member, the second appendage housing member, the third appendage housing member, and the fourth appendage housing member slopes downwardly creating a surface facing a person sitting opposite the respective first appendage housing member, second appendage housing member, third appendage housing member, and fourth appendage housing member.

It is further an object of the present invention to provide a conferencing microphone system wherein top surfaces of each of the first appendage housing member, the second appendage housing member, the third appendage housing member, and the fourth appendage housing member are composed of a mesh material allowing for the passage of audio therethrough such that it may be picked up by the microphones.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
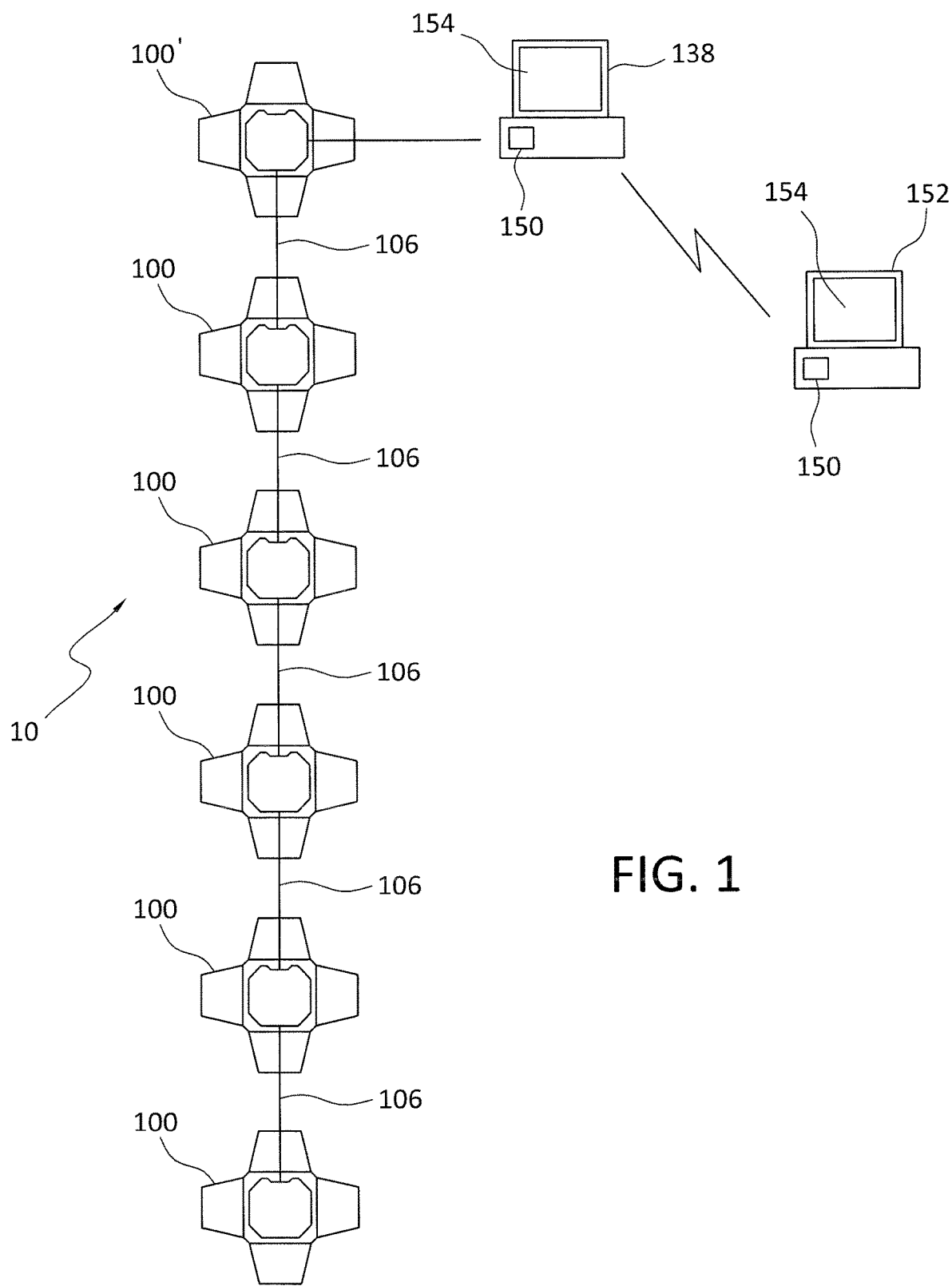
FIG. 1 is a schematic of the present conferencing microphone system.
Figure 2:
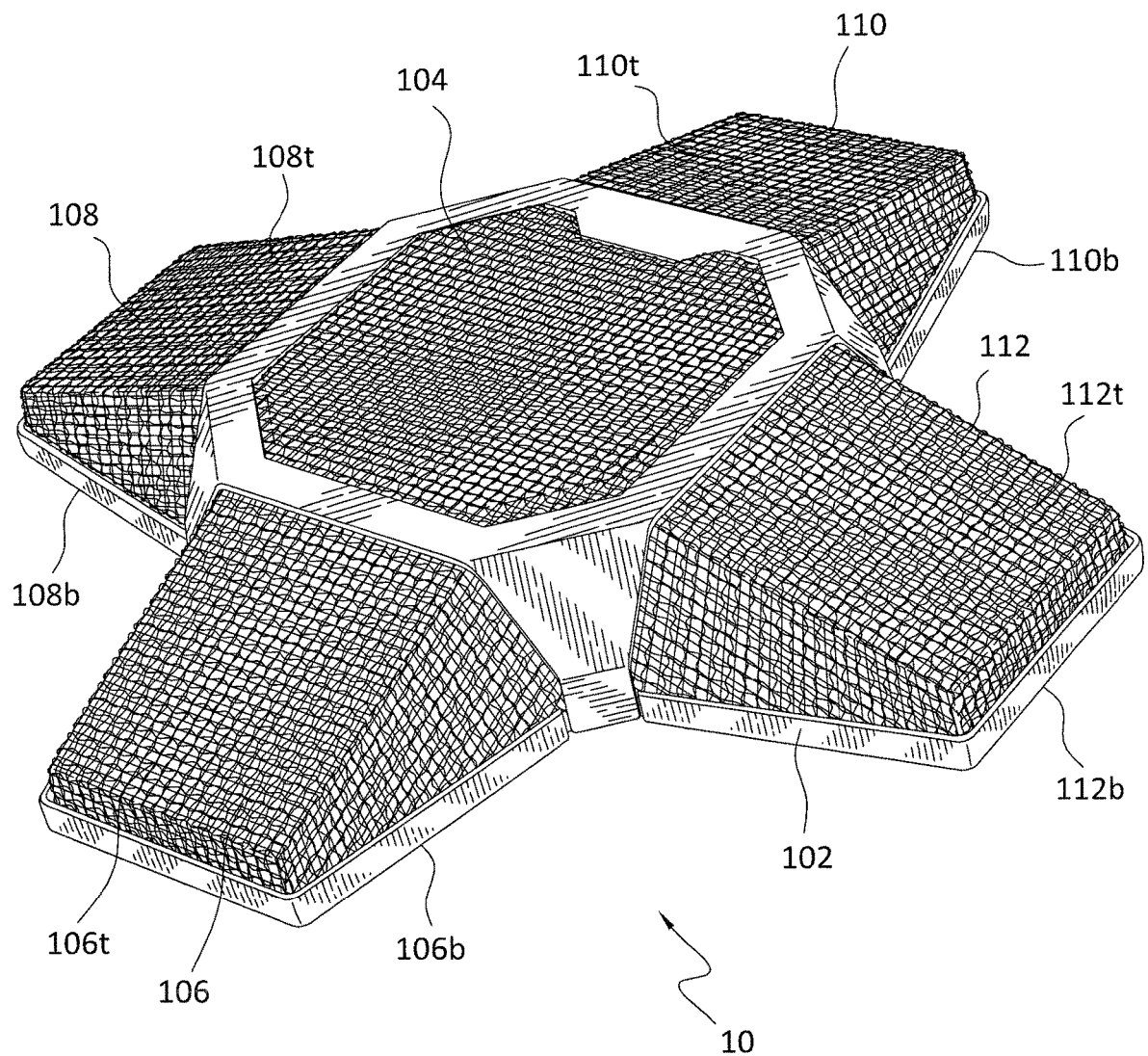
FIG. 2 is a perspective view of a conference microphone in accordance with the present invention.
Figure 3:
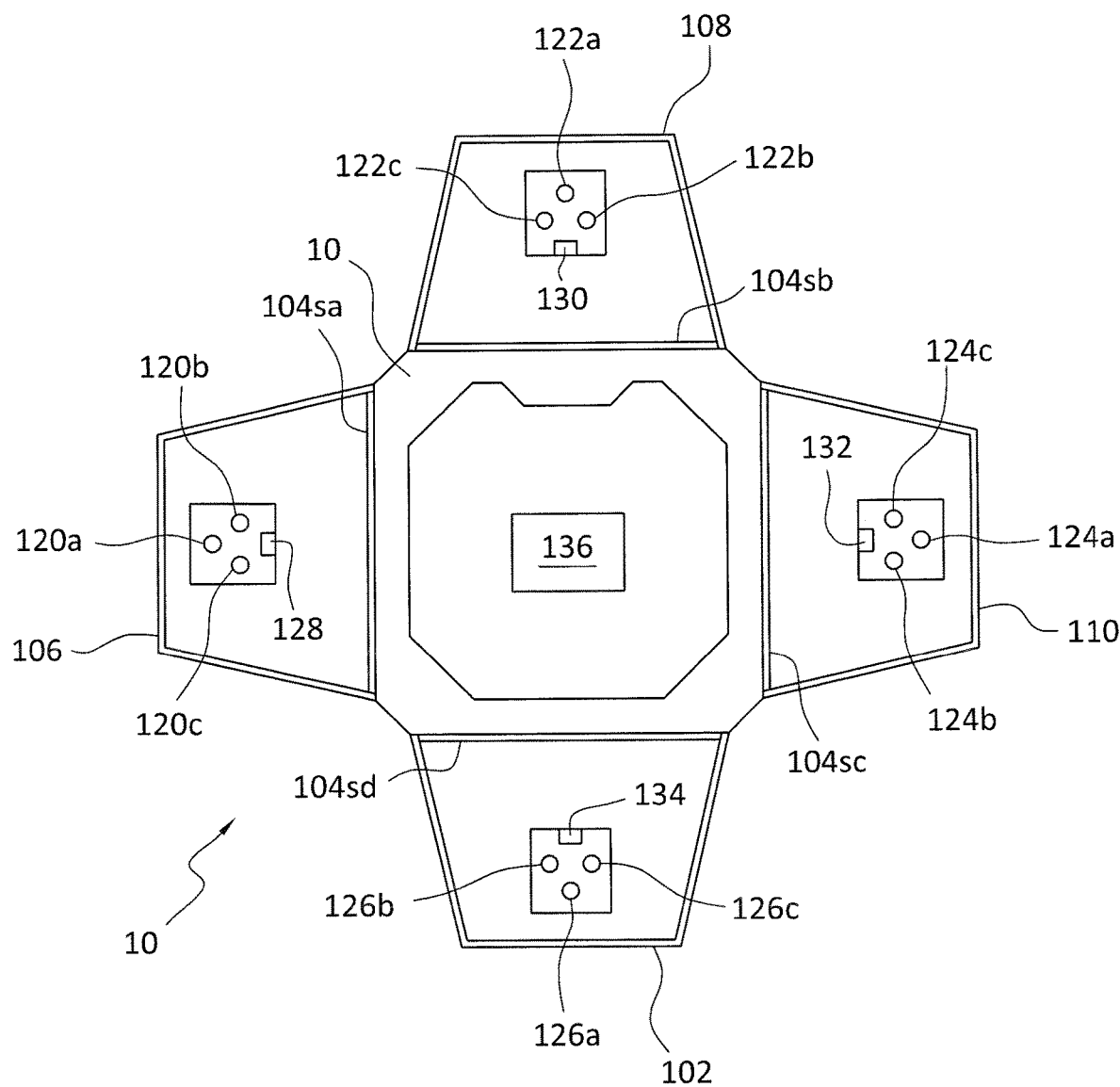
FIG. 3 is a top schematic view of a conference microphone in accordance with the present invention.
Figure 4:
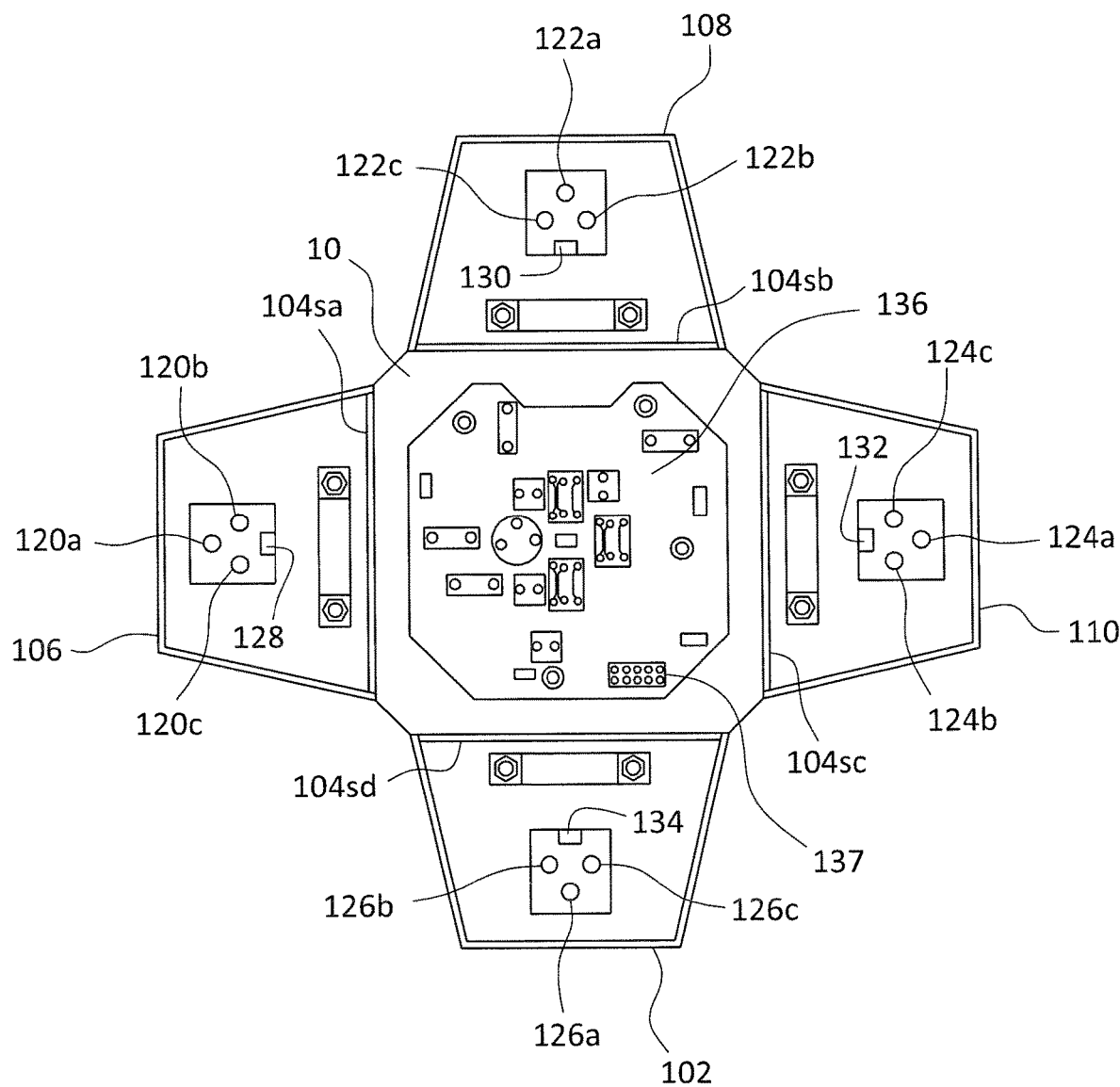
FIG. 4 is a bottom schematic view of a conference microphone in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 7, a conferencing microphone system 10 is disclosed. At the core of the conferencing microphone system 10 is a 360° conference microphone 100. The conference microphone 100 includes a housing 102 in the shape of a cross thereby defining a central housing member 104 having four equally spaced appendage housing members 106, 108, 110, 112 extending therefrom. In addition to the various surfaces described below, the housing 102 includes a plurality of feet 103 supporting it. The central housing member 104 is substantially square shaped when viewed from above and includes a top surface 104t, a bottom surface 104b, and four sides 104sa, 104sb, 104sc, 104sd extending between the top surface 104t and the bottom surface 104b. The first appendage housing member 106 extends from the first side 105sa of the central housing member 104, the second appendage housing member 108 extends from the second side 104sb of the central housing member 104, third appendage housing member 110 extends from the third side 104sc of the central housing member 104, and fourth appendage housing member 112 extends from the fourth side 104sd of the central housing member 104. Each of the first appendage housing member 106, the second appendage housing member 108, the third appendage housing member 110, and the fourth appendage housing member 112 includes a top surface 106t, 108t, 110t, 112t, a bottom surface 106b, 108b, 110b, 112b, and sides extending between the top surface 106t, 108t, 110t, 112t and the bottom surface 106b, 108b, 110b, 112b. As each of the first appendage housing member 102, the second appendage housing member 108, the third appendage housing member 110, and the fourth appendage housing member 112 extends from the central housing member 104 toward a free end thereof, the top surface 106t, 108t, 110t, 112t slopes downwardly creating a surface facing a person sitting opposite the respective first appendage housing member 106, second appendage housing member 108, third appendage housing member 110, and fourth appendage housing member 112.

Each of the first appendage housing member 106, the second appendage housing member 108, the third appendage housing member 110, and the fourth appendage housing member 112 further includes a microphone 120, 122, 124, 126 housed therein. As such, the top surfaces 106t, 108t, 110t, 112t of each of the first appendage housing member 106, the second appendage housing member 108, the third appendage housing member 110, and the fourth appendage housing member 112 are composed of a mesh material allowing for the passage of audio therethrough such that it may be picked up by the microphones 120, 122, 124, 126 without distortion.

Figure 5A:
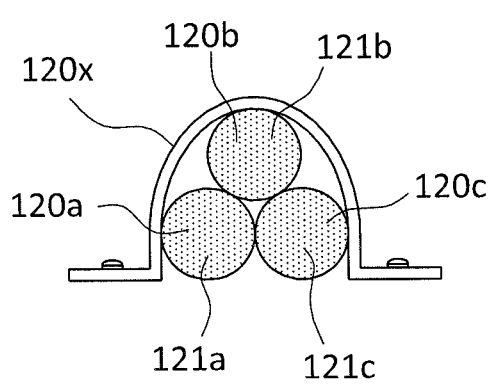
FIGS. 5A and 5B are a front elevation view and a front perspective view of the condenser capsule arrangement in accordance with the present invention.
Figure 5B:
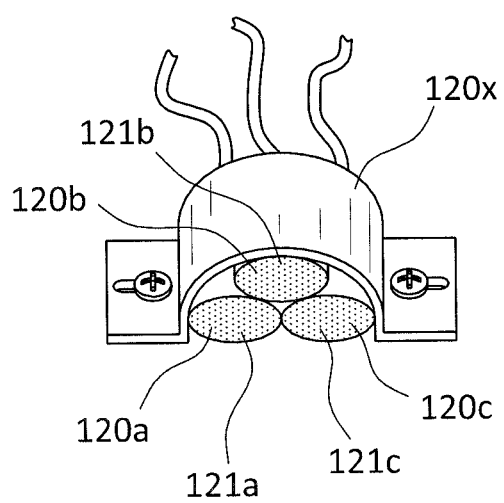
Figure 6:
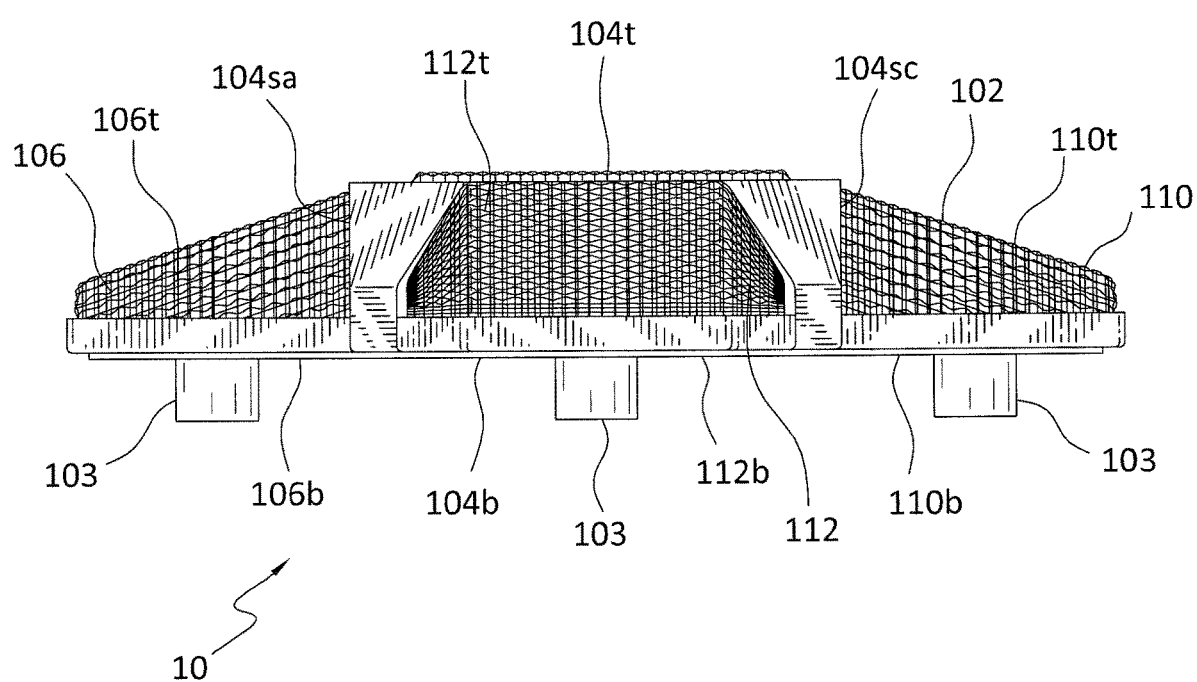
FIG. 6 is a side view of a conferencing microphone in accordance with the present invention.

Each of the microphones 120, 122, 124, 126 is preferably composed of three (3) cardioid condenser capsules 120a-c, 122a-c, 124a-c, 126a-c. As shown in FIGS. 5A and 5B, (it will be appreciated only the condenser capsules of microphone 120 are shown, but the other microphones are identical), the cardioid condenser capsules 120a-c, 122a-c, 124a-c, 126a-c of each of the microphones 120, 122, 124, 126 are generally arranged in a pyramid with the input end 121a-c facing away from the central housing member 104 and a band 120x, 122x, 124x, 126x holding the cardioid condenser capsules 120a-c, 122a-c, 124a-c, 126a-c in place. As those skilled in the art will appreciate, cardioid type microphones are good at rejecting sounds from the side and rear thereof, and are therefore commonly used as vocal or speech microphones.

Each of the microphones 120, 122, 124, 126 also includes a USB output 128, 130, 132, 134 and the USB outputs 128, 130, 132, 134 of each of the first appendage housing member 106, the second appendage housing member 108, the third appendage housing member 110, and the fourth appendage housing member 112 are connected to a USB Hub 136 contained within the central housing member 104. The USB Hub 136 includes a microprocessor 137 allowing for control of the various microphones 120, 122, 124, 126 in a manner that will be appreciated based upon the following disclosure. The USB Hub 136 is further connected to a computer 138 for operation and control of the present conference microphone 100 in a manner described below in greater detail.

Figure 7A:
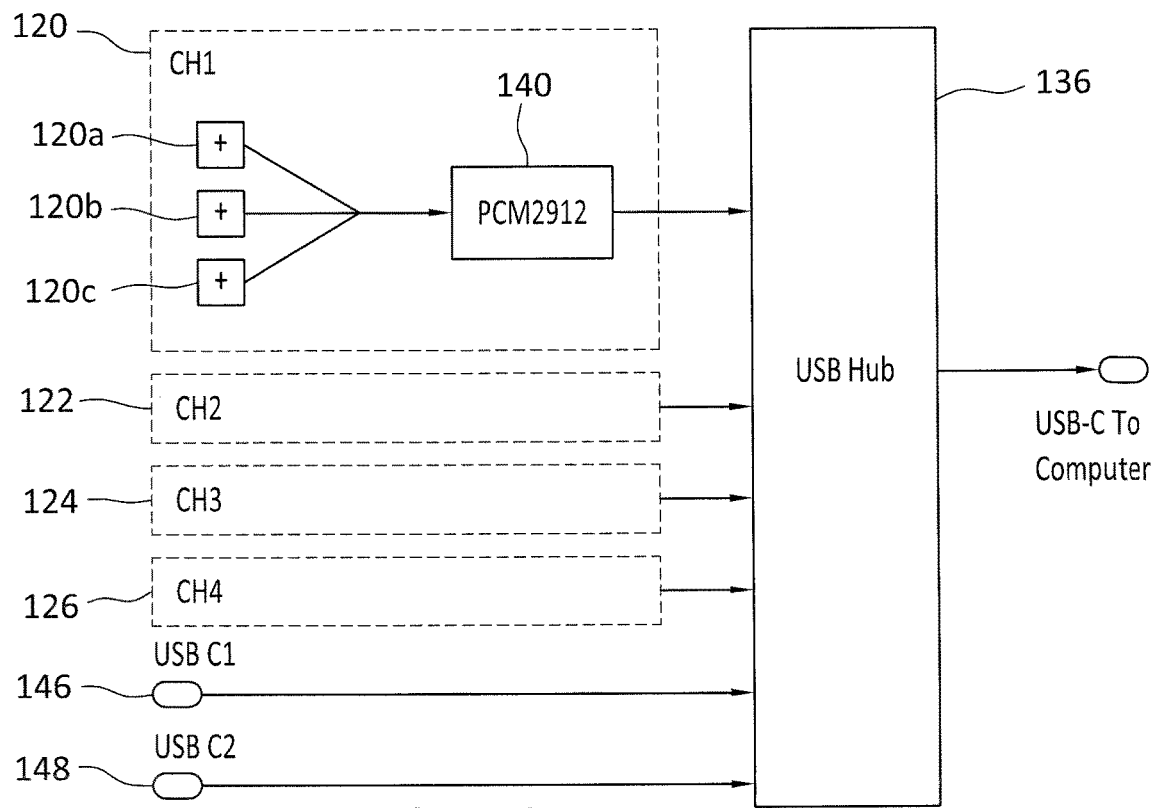
FIGS. 7A and 7B are block diagrams of the alternate embodiments of conference microphone arrangements that may be implemented in accordance with the present invention.

In accordance with one embodiment as described with reference to FIG. 7A, each of the microphones 120, 122, 124, 126 operates in conjunction with a 16-bit ADC (analog to digital converter). In particular, each of the microphones 120, 122, 124, 126 is connected to an audio CODEC with an onboard USB interface and microphone input 140 (for example, a PCM 2912 printed circuit board), which is ultimately connected to the USB Hub 136 contained within the central housing member 104 discussed above. This embodiment also includes a first USB input/output 146 and a second USB input/output 148 coupled to the USB Hub 136 allowing connection of a plurality of conference microphones 100 together in a manner discussed below in detail.

Figure 7B:
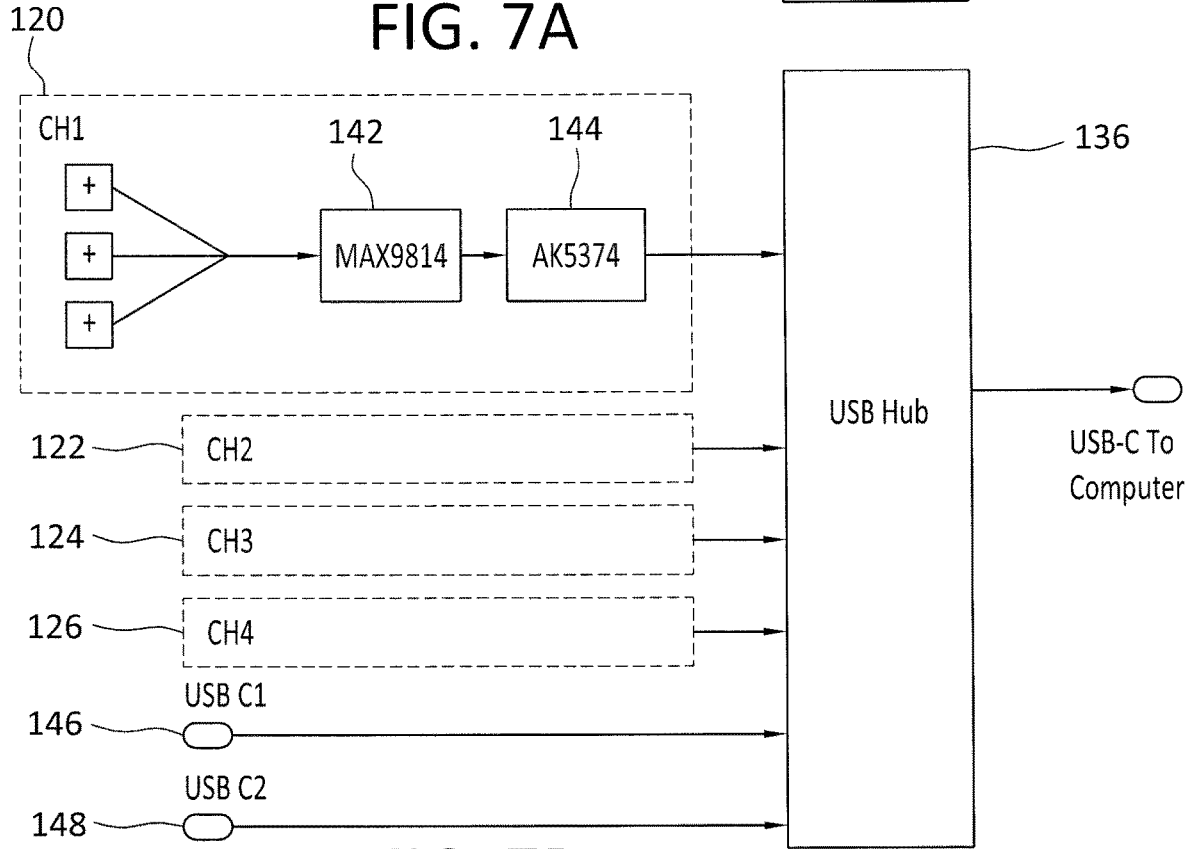

In accordance with another embodiment as described with reference to FIG. 7B, each of the microphones 120, 122, 124, 126 operates in conjunction with a 24-bit ADC (analog to digital converter). In particular, each of the microphones 120, 122, 124, 126 is connected to a microphone amplifier with automatic gain control 142 (for example, a MAX 9814 low-cost, high-quality microphone amplifier with automatic gain control and low-noise microphone), which is connected to a stereo analog-to-digital converter having a USB interface 144 (for example, an AK5374 analog-to-digital converter), which is ultimately connected to the USB Hub 136 contained within the central housing member discussed above. This embodiment also includes a first USB input/output 146 and a second USB input/output 148 coupled to the USB Hub 136 allowing connection of a plurality of conference microphones 100 together in a manner discussed below in detail.

As discussed above, regardless of which embodiment if employed the USB Hub 136 is connected to a computer 138 for control and operation of the conference microphone 100 in accordance with the present invention. Each microphone 120, 122, 124, 126, therefore, operates separately or all four microphones 120, 122, 124, 126 may operate together to generate an omni-directional 360 degree output pattern. The four microphones 120, 122, 124, 126 are addressable from anywhere through computer software 150 to control the volume, mute, and/or add extra voice audio processing to any one of the four microphones. By muting any one of the microphones 120, 122, 124, 126 one can reduce the 360 degree pattern, which is useful when the users are on one side or two sides of a conference room table.

The computer software 150 may be specifically operating on the computer 138 to which the USB Hub 136 is connected or the computer software 150 may be operating on a remote computer 152 connected to the computer 138 to which the USB Hub 136 is connected via a network in a manner well known to those skilled in the art. The computer software 150 provides a graphical user interface 154 allowing a user to control the operation of the conference microphone 100 to optimize the usefulness thereof.

In accordance with a preferred embodiment, the present conferencing microphone system 10 employs a graphical user interface as developed and distributed by the Zoom Video Communications, Inc. The Zoom graphical user interface provides for total control of the microphones used in accordance with the present invention. The Zoom graphical user interface accesses the microphones making up the present conferencing microphone system 10 via the USB Hub 136 of each conference microphone 100. The Zoom graphical user interface is designed to use standard/default USB driver(s) provided by Windows OS or/and Mac OS to interface their software, and the Zoom graphical user interface is, therefore, easily integrated for use in conjunction with the present conferencing microphone system 10.

The Zoom graphical user interface provides for control of the present conferencing microphone system 10 by a single person and from anywhere. Because of the USB Hub 136 in each conference microphone 100 and the connection of the four microphones 120, 122, 124, 126 thereto, the present conferencing microphone system 10 allows an operator to control, for example, volume, of each microphone 120, 122, 124, 126 of one or a plurality of conferencing microphones 100. The Zoom graphical user interface software recognizes each microphone 120, 122, 124, 126 of one or a plurality of conferencing microphone system 10 attached thereto and controls any features that the Windows OS/Mac OS drivers will allow. It is, however, appreciated that other graphical user interfaces may be used, or future graphical user interfaces may be developed.

As briefly explained above, the computer software 150, through the graphical user interface 154, allows a user to determine which microphones 120, 122, 124, 126 are to be active or mute, the volumes associated with the various microphones 120, 122, 124, 126, and/or possible audio processing that one might want to apply to specific microphones 120, 122, 124, 126. For example, where it is known that the participants are only on one side of conference table (or absent from at least one side of a conference table), those microphones 120, 122, 124, 126 not directly across from the participants may be muted allowing optimal audio reproduction.

In addition, and as mentioned above, the conferencing microphone system 10 in accordance with the present invention is not limited to the four microphones 120, 122, 124, 126 of a single conference microphone 100. Rather, and where the number of people participating in a conference is large and/or where the conference room table is large, it may be desirable to use a plurality of conference microphones 100. The first USB input/output 146 and the second USB input/output 148 allow for connecting of up to six (6) conference microphones 100. As shown in FIG. 1, a primary conference microphone 100' is centered on the conference room table and the USB Hub 136 thereof is connected to the computer 138. All of the conference microphones 100, 100' are connected via cables 160 extending between the respective first USB input/output 146 and the second USB input/output 148 of the various conference microphones 100, 100'.

By connecting the plurality of conference microphones 100 in this manner, the computer software 150 is able to access all of the plurality of conference microphones 100, including each of the four microphones 120, 122, 124, 126 of each of the plurality of conference microphones 100, to thereby control the operation of each of the plurality of conference microphones 100 in a manner optimizing usefulness thereof by controlling activation of the microphones 120, 122, 124, 126, controlling the volumes associated with the various microphones 120, 122, 124, 126, and/or controlling audio processing applied to the specific microphones 120, 122, 124, 126, etc.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A conferencing microphone system, comprising:
at least one conference microphone including a central housing member and a plurality of appendage housing members, each of the plurality of appendage housing members including a microphone housed therein, and each of the microphones includes a USB output connected to a USB Hub contained within the central housing member, the USB Hub including a first USB input/output and a second USB input/output coupled thereto in a manner allowing connection of a plurality of conference microphones together.

2. The conferencing microphone system according to claim 1, wherein the USB Hub includes a microprocessor allowing for control of the microphones.

3. The conferencing microphone system according to claim 2, wherein the USB Hub is connected to a computer for operation and control of the conference microphone.

4. The conferencing microphone system according to claim 3, wherein each of the microphones is composed of three cardioid condenser capsules.

5. The conferencing microphone system according to claim 4, wherein the three cardioid condenser capsules are arranged in a pyramid.

6. The conferencing microphone system according to claim 4, wherein the central housing member is substantially square shaped when viewed from above and includes a top surface, a bottom surface, and four sides extending between the top surface and the bottom surface.

7. The conferencing microphone system according to claim 6, wherein a first appendage housing member extends from a first side of the central housing member, a second appendage housing member extends from a second side of the central housing member, a third appendage housing member extends from a third side of the central housing member, and a fourth appendage housing member extends from a fourth side of the central housing member.

8. The conferencing microphone system according to claim 7, wherein each of the first appendage housing member, the second appendage housing member, the third appendage housing member, and the fourth appendage housing member includes a top surface, a bottom surface, and sides extending between the top surface and the bottom surface.

9. The conferencing microphone system according to claim 8, wherein each of the first appendage housing member, the second appendage housing member, the third appendage housing member, and the fourth appendage housing member extends from the central housing member toward a free end thereof, and the top surface of each of the first appendage housing member, the second appendage housing member, the third appendage housing member, and the fourth appendage housing member slopes downwardly creating a surface facing a person sitting opposite the respective first appendage housing member, second appendage housing member, third appendage housing member, and fourth appendage housing member.

10. The conferencing microphone system according to claim 9, wherein top surfaces of each of the first appendage housing member, the second appendage housing member, the third appendage housing member, and the fourth appendage housing member are composed of a mesh material allowing for the passage of audio therethrough such that it may be picked up by the microphones.

11. The conferencing microphone system according to claim 1, wherein each of the microphones is composed of three cardioid condenser capsules.

12. The conferencing microphone system according to claim 11, wherein the three cardioid condenser capsules are arranged in a pyramid.

13. The conferencing microphone system according to claim 1, wherein the central housing member is substantially square shaped when viewed from above and includes a top surface, a bottom surface, and four sides extending between the top surface and the bottom surface, and a first appendage housing member extends from a first side of the central housing member, a second appendage housing member extends from a second side of the central housing member, a third appendage housing member extends from a third side of the central housing member, and a fourth appendage housing member extends from a fourth side of the central housing member.

14. The conferencing microphone system according to claim 13, wherein each of the first appendage housing member, the second appendage housing member, the third appendage housing member, and the fourth appendage housing member includes a top surface, a bottom surface, and sides extending between the top surface and the bottom surface.

15. The conferencing microphone system according to claim 14, wherein each of the first appendage housing member, the second appendage housing member, the third appendage housing member, and the fourth appendage housing member extends from the central housing member toward a free end thereof, and the top surface of each of the first appendage housing member, the second appendage housing member, the third appendage housing member, and the fourth appendage housing member slopes downwardly creating a surface facing a person sitting opposite the respective first appendage housing member, second appendage housing member, third appendage housing member, and fourth appendage housing member.

16. The conferencing microphone system according to claim 15, wherein top surfaces of each of the first appendage housing member, the second appendage housing member, the third appendage housing member, and the fourth appendage housing member are composed of a mesh material allowing for the passage of audio therethrough such that it may be picked up by the microphones.

17. The conferencing microphone system according to claim 1, wherein a second conference microphone is connected to the USB Hub of the conference microphone.

18. A conferencing microphone system, comprising:
at least one conference microphone including a central housing member and a plurality of appendage housing members, each of the plurality of appendage housing members including a microphone housed therein, and each of the microphones includes a USB output connected to a USB Hub contained within the central housing member, the USB Hub including a first USB input/output and a second USB input/output coupled thereto in a manner allowing connection of a plurality of conference microphones together; and wherein each of the microphones is composed of three cardioid condenser capsules.

\* \* \* \* \*